United States Patent Office 2,978,463
Patented Apr. 4, 1961

2,978,463
COMPLEX EPOXY FATTY ESTERS

Frank E. Kuester and Thomas W. Findley, La Grange, Ill., assignors to Swift & Company, Chicago, Ill., a corporation of Illinois No Drawing. Filed Aug. 27, 1956, Ser. No. 606,219

16 Claims. (Cl. 260—348)

This invention relates in general to oxirane containing compounds and to their manufacture and use. More particularly, this invention relates to complex epoxy fatty esters, to an interesterification procedure which can be used for their preparation and to the use of these complex epoxy fatty esters as plasticizers for thermoplastic resins.

Various fatty esters containing oxirane rings or epoxy groups

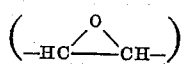

have been prepared and their properties described. According to one method generally used heretofore, unsaturated fatty acid esters of alcohols which may be natural materials such as animal and vegetable fats and oils are treated so that the ethylenic groups (double bonds) are converted to epoxy groups without otherwise altering the molecular structure of the alcohol ester. It has been generally assumed that the production of fatty epoxide or oxirane group-containing materials through interesterification in the presence of an alkali catalyst of an epoxy ester and a non-epoxy ester would fail to yield the desired product because of the fact that the epoxy fatty compounds react with an alkali catalyst as shown by Nicolet and Poulter, Journal of American Chemical Society 53, 1191 (1930), Bauer and Bahr in J. Prakt. Chem. 122, 201–213 (1929) and Swern, U.S. Patent No. 2,542,062.

Epoxy fatty esters produced by the epoxidation of corresponding unsaturated esters are often useful in preparing polyvinyl halide resins displaying superior resistance to the effects of both heat and light. In a resin such as polyvinyl chloride where an epoxy plasticizer is not present, the halogen is liberated from the resin thereby forming hydrogen chloride and an unsaturated bond in the resin itself. The hydrogen chloride's tendency to catalyze further decomposition of the resin may result in a rapid darkening. This darkening may be inhibited to a large extent by using an epoxy material, such as epoxidized soybean oil, as a plasticizer instead of the type plasticizer conventionally employed; e.g. dioctyl phthalate which does little to prevent this objectionable darkening. However, even though it is possible to so prevent color deterioration, a marked stiffening and loss of flexibility occurs in polyvinyl chloride items plasticized solely with epoxy materials such as epoxidized soybean oil, methyl epoxystearate and epoxidized acetylated monolein when exposed to severe aging conditions. This is in some instances at least due to loss of most of the plasticizer through bleeding from the resin. A partial solution is offered by the conventional practice of selecting another plasticizer such as dioctyl phthalate, butyl benzyl phthalate or tricresyl phosphate as the major plasticizer and using a lesser amount of an epoxy compound as a secondary plasticizer whereby to secure the desirable stabilizing properties of epoxy esters while minimizing the stiffening and bleeding to which the latter fall heir. This, of course, is not as convenient as simply admixing a single agent with the polyvinyl chloride resin and is not always entirely effective.

Accordingly it is an object of this invention to produce epoxy fatty esters by a process of transesterification or interesterification employing two esters, at least one of which is an ester of an epoxy fatty acid.

It is another object of this invention to provide a new group of epoxy fatty esters which exhibit good compatibility with the resin even after prolonged exposure.

It is another object of this invention to provide a process for the manufacture of a mixture of substances which may be directly mixed with a polyvinyl halide resin to produce stable plasticized materials which show a resistance to darkening, loss of flexibility and bleeding.

Still another object of this invention is to produce mixtures of compounds which are efficient plasticizers for thermoplastic polyvinyl halide resins such as polyvinyl chloride and which are improved with regard to the bleeding and stiffening encountered in most epoxy fatty ester plasticizers.

Further objects of this invention are to provide a plasticizer having good compatibility with polyvinyl halide resins and to provide a plasticized polyvinyl halide resin of improved stability.

Additional objects and advantages of this invention, if not specifically set out, will become apparent to one skilled in the art during the course of the description which follows.

Broadly, this invention comprises a transesterification process employing an epoxy fatty ester of a fatty chain length of eleven to twenty-two carbons and other organic or phosphoric acid esters; new epoxy esters of di or polyols produced thereby; a method of using these products; and an unusually improved material which may result from their use in polyvinyl halide resins.

As stated above, according to what has heretofore been understood about epoxy compounds, oxirane groups present in the fatty acid portion of an ester would be expected, on interesterification with a second ester, to react with the alkaline interesterification catalysts. It has been found, however, that this is not necessarily the case. Interesterification may be carried out using a conventional alkaline interesterification catalyst and the oxirane groups are found intact in the product. This is true where either of the materials being interesterified contains one or more epoxy groupings and neither ester contains free carboxyl groups. Any of the commonly used alkaline interesterification catalysts may serve to promote the desired reaction. Preferred are the methoxide and ethoxides of the alkali metals potassium, lithium and particularly sodium. Interesterification temperatures of between 50° C. and 130° C. are satisfactory. Generally, a time of between about 1 and 4 hours at the temperatures given will be sufficient to effect the interesterification desired. A catalyst must ordinarily be present in quantities of at least about .3% and the upper limit is generally that employed in ordinary interesterification processes where oxirane groups are not present. Any two esters, at least one of which contains a fatty acid chain of eleven to twenty-two carbon atoms which itself contains one or more oxirane groups may be used in the interesterification process of this invention. In its simplest form, the invention contemplates the interesterification of such materials as methyl epoxy stearate and butyl acetate to yield butyl epoxy stearate. However, by selecting one of the materials to be interesterified from that group of materials which are regarded as good primary plasticizers for polyvinyl halide resins and the other material from that group of fatty epoxy esters which are regarded as good secondary plasticizers for such resins, it is possible after interesterification to secure an epoxy fatty ester which is far superior to a simple physical mixture of primary and secondary plasticizers and performs the functions of both unusually effectively. In addition to the esters customarily regarded as the best primary plasticizers, certain esters which cannot be used as plasticizers because of their high volatility can be transformed by interesterification into heavier molecules which are particularly effective as plasticizers, as shown in Examples XIII–XV, XX–XXII, XXV and XXVI appearing later in the detailed description of the invention. The reaction mixture containing a variety of compounds is preferably directly admixed to the vinyl halide resin to be plasticized in accordance with customary practice.

More particularly, it has been found that contrary to what might be expected, it is possible to employ an interesterification process for the production of new epoxy fatty esters from two other esters containing no free carboxyl groups where one of these materials is an epoxy fatty acid ester without the opening of the oxirane ring. The epoxy group or groups may be present on any ester having a fatty acid chain of a length between eleven and twenty-two carbons. Included and preferred are the epoxidized animal, vegetable and marine oils such as soybean, lard and sperm oils, tallow, grease, rapeseed, linseed and safflower oils and all available straight chain fatty materials, of which methyl epoxy stearate is an example. Any ester of an epoxy fatty acid of proper chain length and a mono, di or polyol may serve in the interesterification process. All free carboxyl groups of the epoxy ester should be entirely esterified. The non-epoxy starting materials which may be used comprise esters of organic acids and phosphoric acid.

The molar ratio of the materials undergoing interesterification will vary depending upon the materials selected and on whether the product, either a mono, di or polyol ester is to have only one or more of its acid chain portions replaced by the new acid chain. For example, in the interesterification of triacetin and methyl epoxy stearate between about one and three molar equivalents of the latter may be required for each of the former depending on whether it is desired to replace one, two or all three of the acetate groups of the triacetin. Selection of the proper molar ratio in accordance with the well understood procedures for interesterification is within the skill of anyone familiar with the art.

Examples of esters of di and polyols which enter into the transesterification or interesterification reaction are the aliphatic and aromatic acid esters of such materials as ethylene glycol, propylene glycol, ethyl hexandiol, butandiol, dodecandiol, diethylene glycol, dipropylene glycol, glycerol or polyglycerols, pentaerythritol, sorbitol and isomers and homologs of the above. Materials such as those listed above having a fairly large molecule are preferred if the ultimate product is to be used as a plasticizer for polyvinyl halide films. If aliphatic acids, these acids are preferably saturated, either straight or branched chain, and have less than 11 carbon atoms. Particularly suitable aromatic acids are the benzoic and alkyl benzoic acids such as toluic or dimethyl benzoic acid. Esters derived from the above which are particularly suitable are dipropylene glycol dibenzoate, diethylene glycol dibenzoate, glyceryl triacetate, pentaerythritol tetrabenzoate and diglyceryl ether tetraacetate.

Examples of inorganic and organic acids which may be completely esterified to produce the second ester used as a starting material are oxalic acid, fumaric acid, glutaric acid, pimelic acid, suberic acid, lactic acid, glycollic acid, tartaric acid, citric acid, succinic acid, adipic acid, azelaic acid, sebacic acid, phthalic acid, terephthalic acid, tetrahydro- and tetrachlorophthalic acids, salicylic acid, benzoic acid and phosphoric acid, as well as the isomers and homologs of the above. Those which are polybasic acids or mono basic aromatic acids are unusually effective as plasticizers for polyvinyl halides when combined with an epoxidized ester of a polyol. Particularly suitable esters derived from the above are tributyl phosphate, tricresyl phosphate, various alkyl aryl phosphates, diisooctyl phthalate, dioctyl isophthalate, butyl benzyl phthalate, tributyl citrate and acetyl tributyl citrate. Such materials, which have been used alone as primary plasticizers, are advantageously employed in the transesterification reaction of this invention to yield materials which are superior plasticizers for polyvinyl halides.

As stated earlier, any of the commonly used alkaline interesterification catalysts may serve to promote the desired reaction. Preferred are the methoxides and ethoxides of the alkali metals such as potassium, lithium and particularly sodium. A more complete list of the catalysts, organic and inorganic, may be found beginning at the bottom of column 4 of U.S. Patent No. 2,625,481 to Mattil et al., and beginning at the bottom of column 5 of U.S. Patent No. 2,625,483 also to Mattil et al.

Interesterification temperatures of between 50° C. and 130° C. are employed. A temperature of about 75° C. to 110° C. is preferred for sodium methylate. Of course, the most effective reaction temperature will vary somewhat depending upon the particular catalyst selected. Temperatures higher than this for any appreciable time period result in extensive decomposition of the oxirane groups. At lower temperatures, the reaction may proceed very slowly, or the fats used may not be in a liquid condition, preventing any reaction.

The time of treatment required to effect interesterification may also vary somewhat depending upon temperature, concentration and the specific catalyst selected and upon the particular reactants selected. As with all transesterification reactions, it may be stated as a general rule that within an effective temperature range, the lower temperatures result in a decreased speed of reaction. A period of about two hours at 100° C. to 110° C. where sodium methylate is used as a catalyst has been found adequate in most cases.

The amount of catalyst used is in the general vicinity, but slightly in excess, of that required for normal interesterification processes. Because of the affinity of interesterification catalysts for moisture and because prolonged drying at excessively high temperatures is to be avoided if damage is not to be done to the oxirane ring, excess catalyst must be used. The exact amount of catalyst will be dependent on other factors, also, such as the free fatty acid content of the esters being treated. Generally, a minimum quantity of sodium methylate will be found to be about 0.3% based on the weight of the mixture. When other catalysts are employed, they should be added in sufficient quantities to provide about the molar equivalent of the sodium methylate which would be necessary.

The mixture of complex esters or the purified high molecular weight epoxy fatty ester of a di or polyol with di or tribasic acids containing no free carboxyl groups which can be obtained by properly selecting the materials to be interesterified may combine in a single molecule the virtues of both a primary plasticizer and a fatty epoxide. Such a material, the preferred product for use as a single plasticizer, may have the following general structural formula:

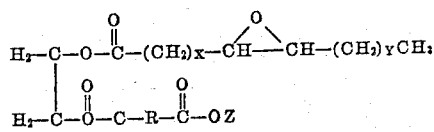

where an epoxy fatty ester of ethylene glycol was interesterified with a di basic acid ester. In the formula above X and Y total between 7 and 18 carbon atoms, R represents an alkyl or aryl group, and Z represents any aliphatic group.

A typical formula for the preferred plasticizer where a glyceride is present at the beginning of the interesterification reaction and the values of X, Y, Z and R are those given above is:

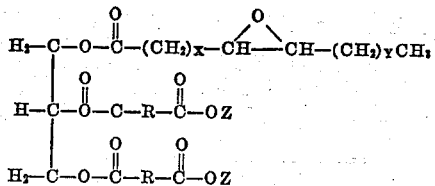

Preferably, one hundred parts of polyvinyl halide in a powdered form is mixed with 5 to 200 parts of this type of plasticizer. Normally, plasticizers are not used at levels above 100 parts per 100 parts of resin. However, various applications require varying quantities of plasticizer and the determination of proper amounts in accordance with well known procedures is well within the skill of the art. To this mixture may be added small amounts of a stabilizer or lubricant, or both, in accordance with conventional practice. The entire mixture is milled on hot rubber rolls until the mass becomes semi-liquid and can be removed as a uniform sheet.

Other suitable methods of fabrication of plasticized resins include plastisol, organosol and extrusion. In plastisol formulation the powdered resin is dispersed in the plasticizer along with any stabilizers and pigments or fillers to be used to form a liquid dispersion. This is then heated after application to fuse and solvate the resin particles in the plasticizer. Upon cooling a flexible resin results. In organosol formulations an organic solvent is used for the plasticizer and a liquid dispersion made as in plastisols. Prior to fusing the resin, the solvent is evaporated. The temperature and time of heating necessary to obtain a strong and flexible film in plastisols and organosols must be sufficient to make the resin and plasticizer homogeneous. For a plasticizer with good solvating characteristics less time or lower temperatures can be used than for one with poor solvation. Some of the compositions of this invention are of the proper chemical structure to be good in this respect, as shown in the following examples.

In extrusion operations, a premix is first made of the plasticizer and resin, along with stabilizers, pigments, fillers, lubricant, etc. In this premixing operation good solvating properties such as shown by some compositions of the following examples are beneficial in reducing the time and temperature required to give a dry blend. This mixture is then heated and extruded hot under pressure through a die of the shape desired. The amount of physical work required can be reduced, or conversely, the resin can be extruded faster for the same physical expenditure if certain of the compositions of this invention are used.

Particularly suitable polyvinyl halide resins are "Geon 101," "Geon 103 EP," and "Geon 121" manufactured by the B. F. Goodrich Chemical Company. These resins are homopolymers of vinyl chloride and differ from one another in particle size, density or molecular weight. "Geon 101" and "Geon 103 EP," are general purpose resins, while "Geon 121" is designed primarily for plastisol or organosol applications. Geon 121 is described in Service Bulletin PR-3, June 1954, of the B. F. Goodrich Chemical Co. Geon 103 EP is described in Service Bulletin G-14, June 1954, of the same company. Geon 101 EP is described in Service Bulletin G-1, March 1950, of the same company. Geon 121 is also described and claimed in U.S. Patent No. 2,188,396.

The examples below show the preparation of various epoxidized esters by the process of this invention. It is to be borne in mind that these examples are entirely for purposes of illustration and are not to be construed as placing limitations on the invention other than as set forth in the appended claims.

EXAMPLE I

*Interesterification of epoxidized soybean oil and butyl benzyl phthalate*

A mixture of 1500 gm. of epoxidized soybean oil and 1500 gm. of butyl benzyl phthalate was dried for one hour under vacuum at 135° C. Fifteen grams of sodium methoxide was added to the constantly stirred mixture after cooling to 110° C. The vacuum of 15-20 mm. was reapplied and the interesterification was allowed to continue for four hours. At the end of this period the reaction mixture was cooled and 30 ml. of 40% peracetic acid was added to inactivate the catalyst and effect a bleach. The peracetic acid treatment was carried out for one-half hour and was followed by a one hour steam deodorization at 100-110° C. and 15-20 mm. The residue from the steam deodorization was bleached with 3% B.C. clay and 0.3% carbon for one-half hour and then filtered.

The analyses of the product and the initial epoxidized soybean oil are listed below:

|  | Epoxidized Soybean Oil | Interesterified Product |
| --- | --- | --- |
| Acid No. | 1.9 | 1.5 |
| Sap. No. | 181.9 | 268.8 |
| IV | 9.3 | 3.3 |
| Percent Oxirane Oxygen | 6.04 | 3.04 |

From the analysis it is clearly evident that there was no reduction of the oxirane content of the above reaction mixture during the interesterification.

The above data does not give any indication of the extent of the interesterification, so distillations under vacuum of the above interesterified product and a 50:50 mixture of epoxidized soybean oil and butyl benzyl phthalate were carried out. The distillations were made at pressures of 2-3 mm. and the distillates boiling below 250° C. were collected. Results of these distillations are tabulated below:

|  | Physical Mixture | | Interesterified Mixture | |
| --- | --- | --- | --- | --- |
|  | Wt. | Sap. No. | Wt. | Sap. No. |
| Charge | 500 g. | 271.5 | 500 gm. | 268.8 |
| Distillate | 245 | 356.0 | 278 | 263.8 |
| Residue |  | 184.7 |  | 271.1 |
| Boiling Range | 180-220° C. | | 170-240° C. | |

The analyses of the two fractions obtained from the physical mixture indicates that the two original components, butyl benzyl phthalate and epoxidized soybean oil, have been effectively separated. However, in the case of the interesterified product, the distillate is a mixture containing phthalic acid esters and fatty acid esters of monohydric alcohols. As shown by the saponification number, the residue from this distillation is the nonvolatile glycerine-phthalic-epoxystearic acid esters including compounds of the following formulae:

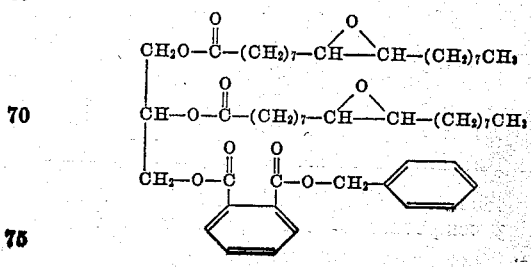

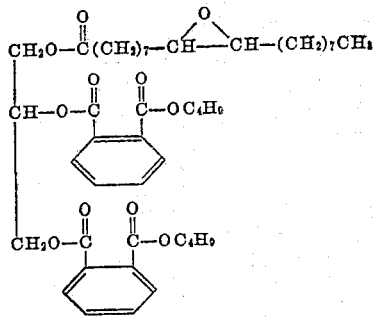

For convenience in writing structural formulae in this and the following examples, 9, 10 epoxystearic acid has been used, although it is recognized that there can be and are other epoxy fatty acids present.

When each fraction was analyzed, all except the distillate from the physical mixture were found to contain oxirane oxygen. Thus, the distillate from the interesterified product contains volatile epoxy fatty acid esters which can be accounted for only by the process of interesterification.

EXAMPLE II

*Interesterification of epoxidized soybean oil and dioctyl phthalate*

The following is a series of interesterifications carried out involving epoxidized soybean oil (ESO) and dioctyl phthalate (DOP). In general the procedure consisted of drying the mixture before interesterification under vacuum at 110–130° C. The sodium methoxide catalyst was then added and the interesterification allowed to continue for a specified length of time at 100–110° C. The catalyst was inactivated and the reaction product was bleached and filtered. Tabulated below are some of the interesterifications carried out in the laboratory with analytical data on the products.

| Percent ESO | Percent DOP | Percent NaOCH₃ | Reaction Time, hrs. | Acid No. | Sap. No. | IV | Percent Oxirane Ox. |
|---|---|---|---|---|---|---|---|
| 25 | 75 | 0.5 | 4 | 1.90 | 261.8 | 1.4 | 1.6 |
| 50 | 50 | 0.5 | 24 | 2.30 | 235.4 | 3.7 | 3.1 |
| 80 | 20 | 1.0 | 2 | 0.30 | 196.0 | ---- | 4.5 |

The products in each case are light colored oils and are mixtures, in varying proportions, of octyl esters of epoxy fatty acids, octyl phthalate-epoxy fatty acid esters of glycerine, and some unreacted dioctyl phthalate.

EXAMPLE III

*Interesterification of epoxidized soybean oil and butyl benzyl phthalate*

Using the techniques previously described, a series of interesterifications of epoxidized soybean oil and butyl benzyl phthalate (BBP) was carried out. The following table lists the weight ratios of the starting materials and analytical results for each product.

| Percent ESO | Percent BBP | Percent NaOCH₃ | Reaction Time, hrs. | Acid No. | Sap. No. | IV | Percent Oxirane Ox. |
|---|---|---|---|---|---|---|---|
| 20 | 80 | 1.0 | 2 | 0.10 | 321.0 | ---- | 1.2 |
| 25 | 75 | 1.5 | 4 | 1.7 | 315.0 | 1.4 | 1.6 |
| 47 | 53 | 0.9 | 4 | 1.05 | 270.3 | 2.0 | 2.6 |
| 50 | 50 | 1.0 | 4 | 0.28 | 270.2 | 4.6 | 3.0 |
| 80 | 20 | 1.0 | 2 | 1.13 | 215.0 | ---- | 4.7 |

The products are light colored oils and are mixtures containing compounds of the type described in Example I.

EXAMPLE IV

*Interesterification of epoxidized lard oil with various esters*

In the following table are listed the compositions of various mixtures of epoxidized lard oil and other esters prior to interesterification. These interesterifications were accomplished using the same procedure as described in Example I.

| Percent Epoxidized Lard Oil | Percent Dioctyl Phthalate | Percent Butyl Benzyl Phthalate |
|---|---|---|
| 50 | ---- | 50 |
| 20 | ---- | 80 |
| 33 | 67 | ---- |

In each case the products were light colored oils which did not show any indication of depositing any solid material upon prolonged standing. They are mixtures such as described above except that the fatty acid esters include more saturated non-epoxy fatty acids.

EXAMPLE V

*Interesterification of epoxidized sperm oil and butyl benzyl phthalate*

The following are the compositions of mixtures of the above materials prior to interesterification.

| Percent Epoxidized Sperm Oil | Percent Butyl Benzyl Phthalate |
|---|---|
| 20 | 80 |
| 50 | 50 |
| 80 | 20 |

The above products are light colored oils which tend to deposit a small amount of solid material when cooled to 0° C. In each case, however, analysis shows that little or no epoxy oxygen has been destroyed during the interesterification.

To the extent that sperm oil contains glycerides of fatty acids (12–30%), these compositions contain compounds of the epoxy fatty acid—phthalic acid—glycerine ester type similar to those described in the previous examples. However, an important portion of the material consists of mixed esters of phthalic acid with epoxy fatty alcohols ($C_{16}$—$C_{20}$), butyl or benzyl alcohols. In addition, there are butyl benzyl phthalates and butyl and/or benzyl esters of epoxy fatty acids ($C_{14}$—$C_{22}$). Removal of the latter constituents as in Example I leaves essentially mixed phthalic esters of epoxy fatty alcohols and lower alcohols.

In fashion resembling that set out in the foregoing Example V, an ester of a monobasic acid, such as methyl benzoate has been interesterified with an alcohol ester such as epoxy octadecyl acetate. The chief product was, in this case, the benzoyl ester of epoxy octadecyl alcohol.

EXAMPLE VI

*Interesterification of epoxidized soybean oil and acetyl tributyl citrate*

A mixture of 1550 gm. of epoxidized soybean oil and 1550 gm. of acetyl tributyl citrate were dried and subjected to interesterification at 105–110° C. for two and one-half hours in the presence of 10 gm. of sodium methoxide. The catalyst was neutralized by the addition of 20 ml. of 40% peracetic acid and then the mixture was deodorized at 120° C. for one hour. The isolated product had the following analysis:

Acid No. ------------------------------- 1.6
Percent Oxirane Ox. -------------------- 2.93

The compounds obtained as a result of the interesterification described above include butyl esters of epoxy fatty acids, acetylated epoxidized glycerides, tributyl citrate ester of epoxy fatty acids and citrate-glycerine-epoxy fatty acid esters some of which are represented by the following formulae:

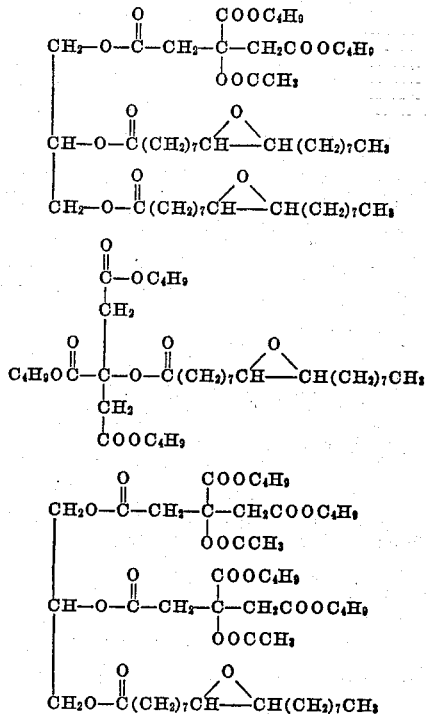

The foregoing shows the interesterification process of this invention using a polybasic hydroxy acid and a polyol.

In similar fashion, the process of the invention has been carried out with another polybasic hydroxy acid ester, tributyl acetyl citrate and a monohydric alcohol ester of a fatty acid, methyl epoxy stearate. The methyl acetate was distilled off as it formed and a product containing the tributyl citrate ester of epoxy stearic acid obtained. For a similar process using hydroxy acid, see Example XX.

EXAMPLE VII

*Epoxidation of interesterified esters of dioctyl phthalate and soybean oil*

Fifteen hundred grams of dioctyl phthalate and 1500 g. of soybean oil were heated to 140° C. for one hour under a vacuum of 15–20 mm. to remove any moisture or volatile material which might be present in the mixture. After cooling to 110° C. 30 gm. of sodium methoxide was added to the constantly stirred mixture. The interesterification was allowed to proceed for two hours. The product was washed with water to remove the catalyst and any soaps formed during the reaction. The dried material had the following analysis:

Acid No. _____ 0.3
Sap. No. _____ 235.8
I.V. _____ 63.2

Two thousand grams of the above interesterified product were epoxidized using 435 gm. of 50% hydrogen peroxide in the presence of 4.4 gm. of concentrated sulfuric acid and 39.0 gm. of 90% formic acid (epoxidation process of copending application Serial No. 437,876). The epoxidation was carried out at 40° C. for twenty-four hours. After removing the excess hydrogen peroxide and acids by water washing, the product was dried and gave the following analysis:

Acid No. _____ 0.4
Sap. No. _____ 231.7
I.V. _____ 3.2
Percent Oxirane Ox. _____ 3.2

The compositions obtained in the above example are essentially the same as those obtained when epoxidized soybean oil and dioctyl phthalate are interesterified directly (Example II). Thus, a second method is provided for preparing the epoxy fatty esters of this invention.

The interesterification product as can be seen by reference to Example I is in each case a mixture of compounds. For example, where glycerol triepoxystearate and dioctyl phthalate are interesterified, the mixture which results contains some unreacted triepoxystearin and dioctyl phthalate, some octyl epoxystearate, and the remainder glycerin-phthalic-epoxystearic acid esters of the following formulae:

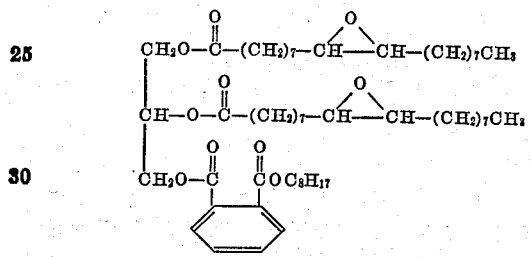

Bis (epoxystearoyl) glyceryl octyl phthalate and

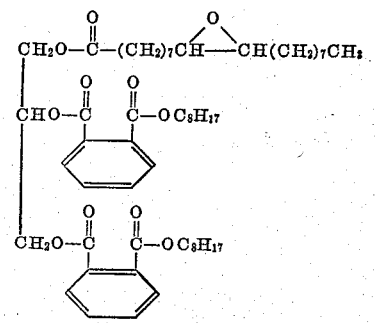

Bis (octyl phthalyl) glyceryl epoxystearate

Examples VIII–XX, XXIII, XXIV and XXVI show the compatibility of the interesterified products of this invention and polyvinyl chloride and other effects of the new product on polyvinyl halide material.

EXAMPLE VIII

*Interesterified epoxy fatty esters as primary plasticizers*

In order to give some indication that the interesterified products in the foregoing examples are primary plasticizers, films plasticized with an interesterified mixture of epoxidized soybean oil and butyl benzyl phthalate and with dioctyl phthalate were prepared and their physical properties compared. The interesterified mixture used in this example had an original composition of 53% butyl benzyl phthalate and 47% epoxidized soybean oil (see Example III).

The films were made up according to the following formula:

|  | Parts |
|---|---|
| Geon 103EP (polyvinyl chloride) | 100 |
| Plasticizer | 40 |
| Stabilizer (barium-cadmium-laurate) | 2 |
| Lubricant (mineral oil) | 0.5 |

The ingredients were mixed in a Hobart Kitchen Mixer to form a uniform dry mix and then were compounded on a two-roll rubber mill at 320° F. for 15 minutes. A film approximately 4 mils thick was taken off the mill.

After aging the films were tested and the results are tabulated below:

|  | Dioctyl Phthalate | Interesterified Mixture |
|---|---|---|
| Elmendorf tear, gm./mil | 300 | 438 |
| Tensile strength, p.s.i | 3,215 | 4,280 |
| Elongation, percent | 200 | 280 |
| 100% modulus, p.s.i | 2,650 | 3,170 |
| Volatile loss (28 hrs. at 300° F.), percent | 23.5 | 13 |
| Heat Stability Test (hrs. to brown at 325° F.) | 2 | 4+ |

From the tests summarized above, it is apparent that the interesterified mixture is substantially better than dioctyl phthalate as a polyvinyl chloride plasticizer. Particularly it may be stated that the interesterified mixture is capable of producing a plasticized polyvinyl chloride having better tear strength, higher tensile strength, better relation between stretch and strength, better heat and light stability and lower volatility than was produced using dioctyl phthalate.

EXAMPLE IX

*Compatibility of interesterified epoxidized lard oil with polyvinyl chloride*

Films of polyvinyl chloride were prepared on a rubber mill at 300° F. using the following formulation:

| | Parts |
|---|---|
| Geon 101 (polyvinyl chloride) | 100 |
| Plasticizer | 67 |
| Stabilizer (barium-cadmium laurate) | 1.7 |
| Lubricant (stearic acid) | 1.7 |

The plasticizer used was an interesterified mixture of epoxidized lard oil and butyl benzyl phthalate at a level of 50% epoxidized lard oil. At the same time, a film plasticized with a physical mixture (not interesterified) of epoxidized lard oil and butyl benzyl phthalate at a level of 50% epoxidized lard oil was also prepared. When the films were subjected to heat stability tests at 160° C. for 1, 2, 3 and 4 hours, no bleeding resulted (showing compatibility) and good heat stability (color, etc.) was observed in the case of the film plasticized with the interesterified mixture. However, the film plasticized with the physical mixture of epoxidized lard oil and butyl benzyl phthalate bled badly and did not have as good heat stability.

The above tests were performed on films of the composition described above except that the plasticizers used were in one case an interesterified mixture of 20% epoxidized lard oil and 80% butyl benzyl phthalate and in the other a physical mixture of the same composition. The results of these tests were similar to the above in that the interesterified product showed better compatibility and better heat stability than the physical mixture.

Thus the results of these tests would indicate that the compatibility of epoxidized lard oil (normally poor) with polyvinyl chloride has been greatly improved by the interesterification process.

EXAMPLE X

*Compatibility of interesterified epoxidized soybean oil with polyvinyl chloride*

Films of polyvinyl chloride were prepared according to the formulation in Example IX. Listed below is a description of the plasticizers in the films.

| Films | Percent Epoxidized Soybean Oil | Percent Dioctyl Phthalate | Description |
|---|---|---|---|
| 1 | 0 | 100 | Interesterified (Ex. II). |
| 2 | 20 | 80 | Physical Mixture. |
| 3 | 20 | 80 | Interesterified (Ex. II). |
| 4 | 50 | 50 | Physical Mixture. |
| 5 | 50 | 50 | |
| 6 | 100 | 0 | |

Portions of the above films were subjected to oven heat of 160° C. and samples were removed every hour until a period of four hours had elapsed. These heat treated samples were labeled and then inspected after nine months' aging. Visual inspection clearly indicated the superior heat stability of the films containing the epoxidized plasticizers. However, all samples prepared using either epoxidized soybean oil alone or physical mixtures of epoxidized soybean oil and dioctyl phthalate showed an increasing amount of tackiness or exudation as the amount of epoxidized soybean oil in the plasticizer mixture was increased.

All the films plasticized with the interesterified mixtures showed improved compatibility characteristics over films plasticized with comparable physical mixtures. None of the films containing the interesterified mixtures listed above showed any significant amount of exudation of the plasticizer.

EXAMPLE XI

*Sun lamp irradiation of films plasticized with physical and interesterified mixtures of butyl benzyl phthalate and epoxidized soybean oil*

Films plasticized with both physical and interesterified mixtures (Ex. III) of 50% epoxidized soybean oil and 50% butyl benzyl phthalate were made up according to the following formulation:

| | Parts |
|---|---|
| Geon 101 (polyvinyl chloride) | 100 |
| Plasticizer | 54 |
| Stabilizer (dibutyl tin dilaurate) | 3 |
| Lubricant (stearic acid) | 1 |

After compounding on a rubber mill at 300° F. in the usual fashion, portions of the sheet were press-polished. Samples of these films were exposed on a turntable to a G.E. sunlamp for a period of eleven days. The distance from lamp to center of the turntable was six inches. Results were as follows:

| Time, days | Physical Mixture | Interesterified Mixture |
|---|---|---|
| 4 | Lost surface-gloss, slight yellowing at center end. | Good surface gloss, slight yellowing at center end. |
| 8 | More yellowing at center end. | Slightly more yellowing at center end. |
| 11 | Dark yellow at center end. | Yellow at center and good surface gloss. |

Since retention of surface gloss is a measure of compatibility of the plasticizer with the resin, the results of this test again indicate the superiority of the interesterified mixture over the physical mixture as a plasticizer. Also, since the interesterified mixture did not discolor as much as did the physical mixture, the resin which it plasticizes has a higher light stability.

EXAMPLE XII

*Comparison of interesterified and physical mixtures of tricresyl phosphate and epoxidized soybean oil as polyvinyl chloride plasticizers*

Fifty parts of tricresyl phosphate and 50 parts of epoxidized soybean oil were interesterified in the presence of 0.5 part of sodium methoxide catalyst. The interesterification was carried out for two hours at 110° C. The reaction was stopped in the normal fashion and the product isolated. This contained the mixed esters of glycerine with epoxy fatty acids and cresyl phosphates. Also, there was present some cresyl epoxy fatty acid ester and some unreacted tricresyl phosphate. Cast films using this product as the sole plasticizer were prepared according to the following formulation:

| | Parts |
|---|---|
| Geon 121 (polyvinyl chloride) | 100 |
| Plasticizer | 40 |
| Stabilizer (barium-cadmium laurate) | 2 |
| Thinner | 15 |

The above formulation was mixed for fifteen minutes after addition of all the ingredients. Films were cast on plate glass using a 1.5 mil Bird applicator. The films were air dried for one hour and then fused for fifteen minutes in an oven at 325° F. At the same time, films were prepared identically using as a plasticizer a physical mixture of fifty parts each of tricresyl phosphate and epoxidized soybean oil. After aging twenty-four hours, tensile strengths on these films were run. Results are indicated below:

| | Interesterified Mixture | Physical Mixture |
|---|---|---|
| Tensile Strength, p.s.i. | 7,710 | 4,400 |

In addition to greater tensile strength, the film made with the interesterified product had much greater percentage elongation.

EXAMPLE XIII

*Epoxy fatty esters of dibutyl glycerophosphate*

Tributyl phosphate and epoxidized soybean oil mixed in equal weights were interesterified for one hour with 1.1% catalyst and the product isolated as previously described.

The product contained some unreacted tributyl phosphate and butyl esters of epoxy fatty acids and some glycerophosphate esters of epoxy fatty acids. It is desirable for some purposes to remove the tributyl phosphate, but to illustrate the compatibility with polyvinyl chloride the following mixture was milled on the rubber mill.

| | Parts |
|---|---|
| Polyvinyl chloride (Geon 101) | 100 |
| Plasticizer prepared above | 67 |
| Stabilizer (barium-cadmium laurate) | 1.3 |

After milling for only five minutes at 300° F., a uniform film had been formed which showed no signs of incompatibility on aging.

EXAMPLE XIV

*Volatility studies on films plasticized with interesterified and physical mixtures of dibtuyl phthalate and epoxidized soybean oil*

Although dibutyl phthalate is not used to plasticize polyvinyl chloride due primarily to its high volatility, it was interesterified with epoxidized soybean oil. Prior to interesterification the mixture was 43.5 parts of dibutyl phthalate and 56.5 parts of epoxidized soybean oil. The interesterification was accomplished in two hours at 110° C. in the presence of 0.5% sodium methoxide. The product was then isolated in the method described in Example I.

Films were prepared using this material and also a comparable physical mixture as plasticizers according to the following formulation:

| | Parts |
|---|---|
| Geon 101 (polyvinyl chloride) | 100 |
| Plasticizer | 40 |
| Stabilizer (barium-cadmium laurate) | 2 |

The films were compounded on a rubber mill at 300° F. and fuming was noted in each instance. After aging, portions of each film were placed in an oven at 330° F. for twenty hours. Both films stiffened as a result of this treatment, but only the film plasticized with the physical mixture shattered when bent. The weight loss from the film plasticized with the physical mixture was 35%, whereas the loss from the film plasticized with the interesterified product was 19%.

The purpose of the tests set out in this example was to study the differences between the interesterified product and the simple mixture of reactants. However, since there is still some free or unreacted dibutyl phthalate in the reaction mixture, it is desirable to remove this excess to further reduce the volatile loss. This product then is a mixture of butyl esters of the epoxidized fatty acids and the glycerine-phthalic-epoxy fatty esters similar to those described in Example I. This product shows excellent plasticizing characteristics.

EXAMPLE XV

*Epoxystearoyl acetyl diethyl glycerophosphate*

460 grams (1 mol) epoxidized diacetyl glycerides derived from soybean oil according to the disclosure of copending application Serial No. 472,764, was dried by heating at 140° C. under vacuum for one hour, mixed with freshly redistilled triethyl phosphate (364 grams, two moles) and sodium methoxide catalyst (5 grams) and held at 90° C. under slight vacuum. Ethyl acetate distilled off and was collected. When one mol (97 ml.) of ethyl acetate was removed, the catalyst was killed by the addition of a few milliliters of water and filtered off. The excess triethyl phosphate was distilled off under vacuum and the last traces of volatile ester removed by steam distillation under vacuum.

The product was a yellow oil containing 5% phosphorous and 3% oxirane oxygen. It contained mainly the mixed acetate-epoxy fatty acid esters of diethyl glycerophosphate.

A typical formula is:

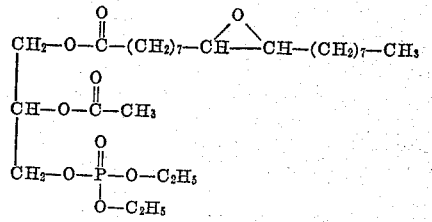

When this liquid is incorporated into a polyvinyl chloride film by compounding on a rubber mill at 300° F. for ten minutes a mixture of 100 parts Geon 101 and 50 parts of plasticizer (no stabilizer or lubricant), a flexible clear film results with high strength and high elongation, good stability, and very low volatile loss. The film is flame resistant and the plasticizer shows no tendency to bleed on aging.

EXAMPLE XVI

*Citrate-glyceride epoxy fatty acid esters*

The interesterification product of Example VI was blended with Geon 101 (polyvinyl chloride) to test compatibilty and processability. Specifically, 40 parts of the interesterification product, 60 parts Geon 101, 1 part stabilizer and 1 part lubricant were milled 10 minutes at 300° F. on a two roll mill. The film formed was clear and flexible and showed no signs of incompatibility on aging.

EXAMPLE XVII

*Low plasticizer level*

The following compound was prepared to study the solvency effect of the plasticizer at low levels and to observe the ease with which a relatively rigid compound could be milled.

The plasticizer was the same interesterified mixture of butyl benzyl phthalate used in Example VIII. The ingredients were as follows:

| | Parts by wgt. |
|---|---|
| Polyvinyl chloride (Geon 103EP) | 100 |
| Plasticizer | 10 |
| Stabilizer | 2 |
| Yellow pigment dispersion | ⅓ |
| Lubricant | ½ |

Milling temperature was 320° F. and a sheet 6–7 mils thick was made. After aging the film showed a tensile strength of 9100 p.s.i. and a maximum elongation of 11%. It showed no color change on heating at 325° F. for four hours.

EXAMPLE XVIII

*High plasticizer level*

The following compound was made to study the compatibility of the plasticizer and strength of the film at very high plasticizer levels.

The plasticizer was the same as in the previous example. The ingredients were as follows:

| | Parts by wgt. |
|---|---|
| Polyvinyl chloride (Geon 101) | 50 |
| Plasticizer | 100 |
| Stabilizer | ½ |

The mixture was well dispersed by one pass over a 3 roll mill and cast to make a film 15 mils thick by heating at 345° F. for 30 minutes.

A clear flexible film resulted with tensile strength of 1000 p.s.i. and 450% maximum elongation. There was no evidence of bleeding of plasticizer on aging.

EXAMPLE XIX

*Glycol diepoxystearate interesterified with butyl benzyl phthalate*

Epoxidized fatty esters other than the glycerides may be used in the interesterification process and the resulting product may be used as a plasticizer for polyvinyl chloride. Using the techniques previously described, one part of ethylene glycol diepoxystearate was interesterified with two parts of butyl benzyl phthalate in the presence of 1% sodium methoxide. Films were prepared using the resulting product as the sole plasticizer according to the following formula:

| | Parts |
|---|---|
| Geon 121 (polyvinyl chloride) | 100 |
| Plasticizer | 40 |
| Stabilizer | 0.8 |
| Solvent (Heptane) | 20 |

The above materials were thoroughly mixed and film of approximately 5 mil thickness was laid on a smooth glass plate. After air drying for one-half hour the film was cured for twenty minutes in an oven at 170° C. The cured film had good clarity and flexibility with no tendency toward bleeding.

Normally glycol diepoxystearate is a solid at room temperature and is a poor plasticizer for polyvinyl chloride. When it is used as the sole plasticizer, the film has rather poor flexibility and upon aging exudes a solid material on the surface. The glycol diepoxystearate was not completely soluble in the butyl benzyl phthalate and had to be warmed to 60° C. before the two materials became miscible. However, the interesterified mixture was homogeneous at room temperature and had to be cooled to 10° C. before any material precipitated out.

A typical formula for the composition formed is as follows:

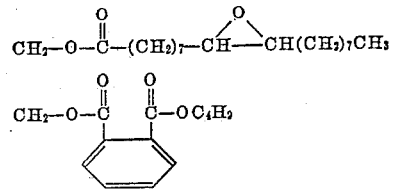

In addition, benzyl and/or butyl epoxystearate and unreacted butyl benzyl phthalate and glycol diepoxystearate are also present in the interesterification mixture. It is apparent that the glycol ester formed is effective as a plasticizer for polyvinyl chloride.

EXAMPLE XX

*Ester of a hydroxy acid and epoxidized soybean oil*

Two hundred grams of ethyl acetoxyacetate and 400 g. of epoxidized soybean oil are heated at 110° C. for one-half hour for drying and then 5 g. of sodium methoxide are added while the mixture is efficiently stirred. The interesterification is allowed to continue for two hours while refluxing the volatiles formed. When the reaction period is completed the reaction mixture is filtered to remove the solid catalyst and then bleached with 10 ml. of 40% peracetic acid for one-half hour. The mixture is vacuum stripped and steam deodorized at 110–120° C. under vacuum for one hour. After bleaching with 2% clay and 0.5% charcoal, a light colored oil with a pleasant odor is obtained.

Films prepared as in Example XIX show the excellent plasticizing properties of the mixed glycollate-epoxy fatty acid esters of glycerine formed above.

A typical formula for the ester formed is as follows:

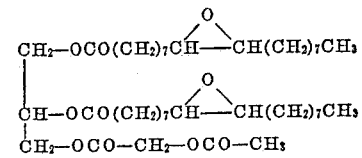

There are also present ethyl and glycollate epoxy fatty acid esters as well as other mixed glycerides.

EXAMPLE XXI

*Interesterification of triacetin and methyl epoxy stearate*

300 grams of methyl epoxy stearate and 200 grams of triacetin were heated to 80° C. After adding 5 grams of sodium methylate the mixture was constantly stirred for two hours. This reaction mixture was then washed with several portions of water to remove the greater part of the unreacted triacetin. The acid number was found to be 1.3, the saponification number 300.5, the percent epoxy oxygen present in the product 3.10 and the iodine value 11.4. The product was found to be a mixture of acetyl diepoxystearin and diacetyl monoepoxystearin.

EXAMPLE XXII

*Interesterification of epoxidized lard oil with triacetin*

The following example shows ratios of triacetin to epoxidized lard oil prior to addition of the catalyst:

| Percent ELO | Percent Triacetin |
|---|---|
| 50 | 50 |
| 33 | 67 |

All the products were isolated in the manner previously described except those involving triacetin. Here the triacetin mixture was subjected to steam stripping under vacuum to remove the unreacted triacetin. All of the products were light colored oils.

The preceding and Examples II–V show the variety of ratios of esters one to another whereby to secure varying amounts of the desired components in the product.

The following examples show the preparation of a compound combining in a single molecule an epoxy fatty group (or groups) and a benzoate group (or groups) with a glycerine or diglycol:

EXAMPLE XXIII

*Interesterification of epoxidized soybean oil with diethylene glycol dibenzoate*

Eight hundred grams of epoxidized soybean oil and 800 grams of diethylene glycol dibenzoate were dried under vacuum for one-half hour at 105° C. After the drying period, 16 grams of sodium methoxide were added to the constantly stirred mixture and the interesterification allowed to proceed for two hours at the above temperature. When the reaction period was completed, the catalyst was neutralized and the interesterified mixture isolated by deodorization and filtration.

The product obtained by interesterification is a mixture more complex than it was prior to interesterification. Listed below are some of the possible structures obtained in the mixture in addition to small amounts of the original materials:

$$\text{C}_6\text{H}_5-\overset{\text{O}}{\overset{\|}{\text{C}}}-\text{O}-\text{CH}_2-\text{CH}_2-\text{O}-\text{CH}_2-\text{CH}_2-\text{O}-\overset{\text{O}}{\overset{\|}{\text{C}}}-(\text{CH}_2)_7-\overset{\text{O}}{\overset{\diagdown\diagup}{\text{CH}-\text{CH}}}-(\text{CH}_2)_7-\text{CH}_3$$

$$\text{CH}_3-(\text{CH}_2)_7-\overset{\text{O}}{\overset{\diagdown\diagup}{\text{CH}-\text{CH}}}-(\text{CH}_2)_7-\overset{\text{O}}{\overset{\|}{\text{C}}}-\text{O}(\text{CH}_2)_2\text{O}-(\text{CH}_2)_2-\text{O}\overset{\text{O}}{\overset{\|}{\text{C}}}-(\text{CH}_2)_7-\overset{\text{O}}{\overset{\diagdown\diagup}{\text{CH}-\text{CH}}}-(\text{CH}_2)_7\text{CH}_3$$

$$\begin{array}{l}\text{CH}_2-\text{O}-\overset{\text{O}}{\overset{\|}{\text{C}}}-\text{C}_6\text{H}_5\\ |\\ \text{CH}-\text{O}-\overset{\text{O}}{\overset{\|}{\text{C}}}-(\text{CH}_2)_7-\overset{\text{O}}{\overset{\diagdown\diagup}{\text{CH}-\text{CH}}}-(\text{CH}_2)_7\text{CH}_3\\ |\\ \text{CH}_2-\text{O}-\overset{\text{O}}{\overset{\|}{\text{C}}}-(\text{CH}_2)_7-\overset{\text{O}}{\overset{\diagdown\diagup}{\text{CH}-\text{CH}}}-(\text{CH}_2)_7\text{CH}_3\end{array}\qquad\begin{array}{l}\text{CH}_2-\text{O}-\overset{\text{O}}{\overset{\|}{\text{C}}}-\text{C}_6\text{H}_5\\ |\\ \text{CH}-\text{O}-\overset{\text{O}}{\overset{\|}{\text{C}}}-\text{C}_6\text{H}_5\\ |\\ \text{CH}_2-\text{O}-\overset{\text{O}}{\overset{\|}{\text{C}}}-(\text{CH}_2)_7-\overset{\text{O}}{\overset{\diagdown\diagup}{\text{CH}-\text{CH}}}-(\text{CH}_2)_7\text{CH}_3\end{array}$$

Films of polyvinyl chloride using the interesterified product as plasticizer were prepared by milling in a two-roll mill at 300° F. for 15 minutes the following mixture:

| | Parts |
|---|---|
| Polyvinyl chloride resin (Geon 101) | 60 |
| Plasticizer | 40 |
| Stabilizer (barium-cadmium laurate) | 1 |
| Lubricant | 1 |

The film was clear and flexible and showed no sign of bleeding after six months.

A similar mixture was also prepared using dipropylene glycol dibenzoate in the above procedure. The results were quite similar.

EXAMPLE XXIV

*Benzoyl diglycol epoxy stearate*

A mixture of diethylene glycol dibenzoate (314 grams, one mol) and methyl epoxystearate (313 grams, one mol) is heated under vacuum at 140° C. for one hour to remove any possible trace of moisture, then cooled to 100° C. and sodium methoxide catalyst (4 grams) added. Heating at this temperature is continued for four hours while lowering the pressure to about 1–2 millimeters of mercury. Methyl benzoate is removed during this operation, and the last traces are removed by a further steam deodorization after filtration to remove the spent catalyst.

The product, a mixed benzoate-epoxystearate of diethylene glycol, is a light yellow oil with a faint pleasant odor.

$$\begin{array}{l}\text{O}-\text{CO}-\text{C}_6\text{H}_5\\ |\\ \text{CH}_2\\ |\\ \text{CH}_2\\ |\\ \text{O}\\ |\\ \text{CH}_2\\ |\\ \text{CH}_2\\ |\\ \text{O}-\text{CO}-(\text{CH}_2)_7-\overset{\text{O}}{\overset{\diagdown\diagup}{\text{CH}-\text{CH}}}-(\text{CH}_2)_7-\text{CH}_3\end{array}$$

It differs from the composition of Example I which contains some benzoyl glycerides admixed with this material.

When incorporated into a polyvinyl chloride resin film (100 parts Geon 101, 40 parts benzoyl glycol epoxystearate, no stabilizer or lubricant) by milling on a two-roll mill at 300° F. for ten minutes, a clear flexible film results which has good heat and light stability and good tensile properties. The plasticizer shows no tendency to bleed upon aging.

The following example shows the interesterification process of this invention where two glycerides are used as reactants:

EXAMPLE XXV

*Interesterification of epoxidized soybean oil and triacetin*

Fifty parts of epoxidized soybean oil and 50 parts of triacetin were interesterified in the presence of 1% sodium methoxide at 100–110° C. for one hour. After the catalyst was deactivated the reaction mixture was deodorized at 130–135° C. to remove the unreacted triacetin. Analysis of the product is listed below:

| | |
|---|---|
| Acid No. | 0.95 |
| Sap. No. | 428.0 |
| I.V. | 4.6 |
| Percent Ep. Ox. | 3.55 |

The product is a mixture of the diacetyl and monoacetyl derivatives with some unreacted triacetin.

The last example below shows the process of this invention using volatile esters.

EXAMPLE XXVI

*Interesterification of epoxidized soybean oil with ethyl acetate and n-amyl acetate*

When volatile esters are involved in an interesterification with epoxidized soybean oil, the procedure is in general the same as described in Example I. The exception is that during the interesterification, care should be taken that none of the volatile ester is removed from the reaction mixture. After the interesterification and deactivation of the catalyst, the reaction mixure is subjected to a steam deodorization to remove the excess of the volatile ester. Listed below are conditions under which two interifications of epoxidized soybean oil with volatile esters were carried out:

| Percent Epoxidized Soybean Oil | Ester | Percent NaOCH₃ | Reaction Time, hrs. | Reaction Temp. |
|---|---|---|---|---|
| 42 | Ethyl Acetate | 1.0 | 2 | Reflux Temp. 110° C. |
| 40 | n-Amyl Acetate | 1.6 | 2 | |

The composition of the reaction product after removal of the volatile ester is a mixture of the monohydric alcohol esters of epoxy fatty acids, and acylated mono-, and diglycerides of epoxidized soybean oil. These compositions are useful as low temperature plasticizers for polyvinyl chloride.

As indicated above, it has been found that unusually effective plasticizing results are secured in accordance with the teachings of this invention in halogen-containing resins generally. And there are other advantages in the use of these complex esters too. As shown in Examples VIII and XII, certain of the new compositions bring out improved tensile characteristics when incorporated into polyvinyl chloride resins. They may also facilitate processing. The results tabulated and set forth under the heading Example VIII show that both strength and maximum elongation are increased where the interesterified composition is employed instead of an ordinary primary plasticizer, such as dioctyl phthalate. This is unusual, for it is generally anticipated that plasticizers which have a beneficial effect on maximum elongation adversely influence film strength.

The epoxy fatty acid—phthalic acid—glycerides of Example VIII also show unusually rapid dry mixing when mixed with powdered polyvinyl chloride resin. In addition, extrusion of film is possible at an unusually rapid rate operating at unusually low temperatures, although exceptionally high die temperatures can be used. This allows for greater rate of production, with less frequent shut downs for cleanup of charred material.

Unusual results are also observed where the tensile strength and maximum elongation of the product of Example XII is tested. It is believed that the improved results here may be due to the ease of solvation of the resin by the interesterified plasticizer.

The compositions of Examples XXIII and XXIV share most of the advantages of the preferred plasticizers for polyvinyl halides; specifically, greater heat and light stability without sacrificing compatibility and low volatility with good tensile properties. This was not expected to be the case as the acid portions of the esters are not derived from polybasic acids. However, it is believed that the fact that the acid portion is derived from an aromatic acid having a large size and a substantial molecular weight is the explanation for the improved results obtained.

While the preferred resin is the common polyvinyl chloride, others which may be employed are those which are also made from vinyl compounds such as vinylidene chloride, vinyl chloracetate, chloro styrenes and chloro butadienes. Such vinyl compounds can be polymerized singly or in admixture with these or other halogen-containing vinyl compounds or with vinyl compounds free from halogen. For example, there are a large number of unsaturated materials which are free from halogen and which may be copolymerized with halogen-containing vinyl compounds; e.g. vinyl esters of carboxylic acids—vinyl acetate, vinyl propionate, vinyl butyrate, and vinyl benzoate. Esters of unsaturated acids which may serve are methyl acrylate, allyl acrylate and the corresponding esters of methacrylic acid. Vinyl aromatic compounds which are suitable are styrene, para-ethyl styrene, divinyl benzene, vinyl naphthalene, and alpha-methyl styrene. Other unsaturated materials which serve are the dienes such as butadiene, unsaturated amides such as acrylic acid amide, acrylic acid anilide, unsaturated nitriles, such as acrylonitrile; esters of alpha-beta-unsaturated carboxylic acids as for example the methyl, ethyl, propyl, butyl, amyl, hexyl, heptyl, octyl, allyl and methallyl and the phenyl esters of maleic, crotonic, itaconic, fumaric acids and the like. However, it is preferred to form these copolymers from substances which contain at least 50% by weight of a halogen-containing vinyl compound such as polyvinyl chloride.

The plasticizers to which this invention is directed are also particularly effective when intimately admixed with halogen-containing resins in which part or all of the halogen is introduced into preformed resin. For example, chlorinated polyvinyl acetate, chlorinated polyvinyl styrene, chlorinated polyvinyl chloride, chlorinated natural and synthetic rubbers such as rubber hydrochloride are particularly suitable. The plasticizer should, however, always be added after introduction of the halogen.

While attention has been directed entirely to chlorine-containing resins, it is to be borne in mind that resins containing halogens other than chlorine such as bromine, fluorine and iodine may also be formed and to which these plasticizers may be added with beneficial results.

While it is entirely possible to use pure esters as starting materials, it is most feasible from the standpoint of raw materials cost to use mixtures which occur in various natural oils, as for example, linseed, castor, soya bean, perilla, corn, cottonseed, sunflower, safflower, sesame, poppy, walnut, peanut, olive, rapeseed, and whale oil.

It is seen therefore that by following the teachings of this invention, it is possible to produce a plasticizer for vinyl halide resins from readily available organic compounds which has decided superiority to the conventional physical mixture of primary and secondary plasticizers. The compositions show improved compatibility with vinyl halide resins and decreased tendency to bleed out or volatilize. The plasticized resins secured display improved heat and light stability and good color and they are prepared with ease. Further, as can be seen by reference to the examples, the resulting polyvinyl halide resins may possess other unusual properties, for example, improved tensile strength and tear strength, and ability to tolerate a much greater degree of elongation than can polyvinyl halide resins plasticized with a simple physical mixture of primary and secondary plasticizers of the type used as starting materials for reaction of this invention.

By "fatty acids" as used herein, it is intended to include all acids normally included with the term including the straight or branched chain substituted or unsubstituted aliphatic acids; by "organic acid" or "carboxylic acid," as used herein, it is intended to include all aliphatic and aromatic acids and hydroxy acids containing one or more —COOH groups; and by the prefix "poly" it is intended to indicate the presence of two or more of the groups under consideration. For example "polybasic acid" refers to an acid containing two or more carboxyl groups and "Polyol" refers to an alcohol containing two or more hydroxyl groups. Where the term "functional group" is used herein with relation to acids and alcohols and their esters it is intended to include the

group of an alcohol and the

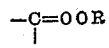

group of an acid wherein the symbol "R" refers to an aryl, alkyl or an acyl group or a hydrogen atom.

Obviously, many modifications and variations of the invention as hereinbefore set forth may be made without departing from the spirit and scope thereof, and therefore only such limitations should be imposed as are indicated in the appended claims.

We claim:
1. A process for the preparation of oxirane-containing fatty acid esters comprising: admixing together two different esters, substantially all carboxyl groups of said esters being entirely esterified, one of said esters being an ester of an oxirane-containing fatty acid; adding thereto a small amount of an alkaline interesterification catalyst; and adjusting the temperature of the mixture so formed to a temperature of about 50° C. to about 130° C. whereby interesterification is effected to produce an oxirane-containing fatty ester substantially all carboxyl groups of which are entirely esterified.

2. A process for the preparation of esters of oxirane-containing fatty acids comprising: admixing together different esters, substantially all carboxyl groups of said esters being entirely esterified, one of said esters being an ester of an oxirane-containing fatty acid; adding thereto a small amount of an alkaline interesterification catalyst; and adjusting the temperature of the mixture so formed to a temperature of about 50° C. to about 130° C. whereby interesterification is effected to produce an oxirane-containing fatty ester in which substantially all carboxyl groups are entirely esterified.

3. A process for the preparation of oxirane-containing fatty acid esters comprising: to an ester of an oxirane-containing fatty acid in which substantially all carboxyl groups are esterified admixing a second ester substantially all carboxyl groups of which are esterified, one of said esters being an ester of an aliphatic lower polyol, one of said esters being selected from the group consisting of esters of polybasic aliphatic acids having less than 11 carbon atoms, monobasic benzenoid acids, alkyl benzenoid acids, hydroxy acids, phosphoric acid and mixtures thereof; adding thereto a small amount of an alkaline interesterification catalyst; and adjusting the temperature of the mixture to an elevated temperature, whereby interesterification is effected to produce an epoxy fatty ester of a polyol in which at least one of the hydroxyl groups of said polyol is esterified with a member selected from the said acid group.

4. An oxirane-containing fatty acid ester of a lower aliphatic polyol having 2-6 hydroxy groups in which an hydroxy group is esterified with an acid selected from the group consisting of polybasic aliphatic acids having less than 11 carbon atoms, monobasic benzenoid acids, alkyl benzenoid acids, hydroxy acids, phosphoric acid and mixtures thereof, substantially all acid groups being completely esterified.

5. An ester of an oxirane-containing fatty acid, the fatty acid chain length of which is 11 to 22 carbon atoms, of a lower aliphatic polyol having 2-6 hydroxy groups in which an hydroxy group is esterified with an acid selected from the group consisting of polybasic aliphatic acids having less than 11 carbon atoms, monobasic benzenoid acids, alkyl benzenoid acids, hydroxy acids, phosphoric acid and mixtures thereof, substantially all acid groups being completely esterified.

6. The product of claim 5 wherein the polyol is a glycol.

7. The product of claim 5 wherein the acid is phthalic acid.

8. The product of claim 5 wherein the acid is benzoic acid.

9. The product of claim 5 wherein the acid is phosphoric acid.

10. The product of claim 5 wherein the acid is citric acid.

11. An ester of an oxirane-containing fatty acid characterized by the following formula:

in which one but not more than two of said symbols R represents an oxirane-containing fatty acid group having a fatty acid chain length of between 11 and 22 carbon atoms and in which all additional symbols R represent acid groups selected from the class consisting of polybasic aliphatic acids having less than 11 carbon atoms, monobasic benzenoid acids, alkyl benzenoid acids, hydroxy acids, phosphoric acid and mixtures thereof, substantially all acid groups being completely esterified.

12. An ester of an oxirane-containing fatty acid of glycerine in which the fatty chain length is 11 to 22 carbon atoms, one but not more than two of the hydroxyl groups being esterified with an acid selected from the group consisting of polybasic aliphatic acids of less than 11 carbons, benzenoid acids, alkyl benzenoid acids, hydroxy acids, phosphoric acid and mixtures thereof substantially all free acid groups of said acid being completely esterified.

13. The product of claim 12 in which the fatty acid is a mixture of soybean oil fatty acids.

14. The product of claim 12 in which the fatty acid is a mixture of lard oil fatty acids.

15. The product of claim 12 in which the fatty acid is a mixture of sperm oil fatty acids.

16. An ester of an oxirane-containing glyceride selected from the group consisting of animal, vegetable, and marine oils, one of the hydroxyl groups of said glycerides being esterified with an acid selected from the group consisting of polybasic aliphatic acids of less than 11 carbon atoms, benzenoid acids, alkyl benzenoid acids, hydroxy acids, phosphoric acid and mixtures thereof substantially all free acid groups of said acid being completely esterified.

References Cited in the file of this patent

UNITED STATES PATENTS

| | | |
|---|---|---|
| 2,400,333 | Brent et al. | May 14, 1946 |
| 2,537,981 | Edwards | Jan. 16, 1951 |
| 2,569,502 | Swern et al. | Oct. 2, 1951 |
| 2,602,685 | Wiles et al. | July 8, 1952 |
| 2,671,064 | Cowell et al. | Mar. 2, 1954 |
| 2,680,109 | Stevens et al. | June 1, 1954 |
| 2,768,153 | Shokal | Oct. 23, 1956 |

FOREIGN PATENTS

| | | |
|---|---|---|
| 202,702 | Australia | June 21, 1956 |

OTHER REFERENCES

H. B. Knight et al.: A.C.S. Abstracts of Papers 125th Meeting.

UNITED STATES PATENT OFFICE
CERTIFICATION OF CORRECTION

Patent No. 2,978,463                                                           April 4, 1961

Frank E. Kuester et al.

It is hereby certified that error appears in the above numbered patent requiring correction and that the said Letters Patent should read as corrected below.

Column 3, line 58, for "hove" read -- have --; column 5, lines 7 to 9, for that portion of the formula reading

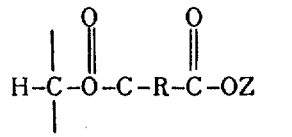      read      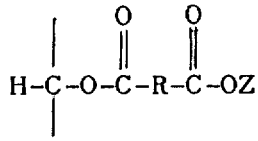

column 14, line 68, EXAMPLE XVI, in the heading, for "Citrate-glyceride", in italics, read -- Citrate-glycerine --, in italics; column 16, lines 6 to 10, for the left-hand portion of the formula reading

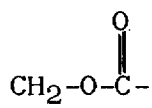

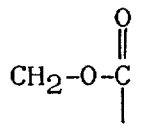      read      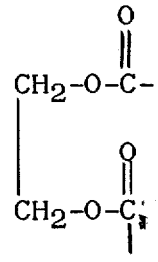

Signed and sealed this 19th day of September 1961.

(SEAL)
Attest:

ERNEST W. SWIDER                                        DAVID L. LADD
Attesting Officer                                           Commissioner of Patents